(12) United States Patent
Lee

(10) Patent No.: US 7,738,237 B2
(45) Date of Patent: Jun. 15, 2010

(54) TUNABLE INTER-DIGITAL CAPACITOR AND METHOD OF MANUFACTURING THE SAME

(75) Inventor: Young Chul Lee, Mokpo-Shi (KR)

(73) Assignee: Research and Industrial Cooperation Group, Daejeon-Shi (KR)

( * ) Notice: Subject to any disclaimer, the term of this patent is extended or adjusted under 35 U.S.C. 154(b) by 349 days.

(21) Appl. No.: 11/789,311

(22) Filed: Apr. 24, 2007

(65) Prior Publication Data

US 2008/0049375 A1    Feb. 28, 2008

(30) Foreign Application Priority Data

Aug. 23, 2006   (KR) .................. 10-2006-0079993

(51) Int. Cl.
*H01G 4/06* (2006.01)
*H01G 4/005* (2006.01)

(52) U.S. Cl. ..................... 361/311; 361/303

(58) Field of Classification Search ............. 361/303, 361/311, 304; 29/25.42
See application file for complete search history.

(56) References Cited

U.S. PATENT DOCUMENTS 6,266,226 B1 * 7/2001 Hayashi ............ 361/303
6,356,429 B2 * 3/2002 Hayashi ............ 361/303
2001/0028545 A1 * 10/2001 Hayashi ............ 361/303
2005/0092845 A1 * 5/2005 Forster ............. 235/492

OTHER PUBLICATIONS

Lee et al., "Reconfigurable Inter-Digital Capacitor Embedded in BZN Thin Film Dielectrics for Microwave Applications", Korean Electromagnetic Engineering Society, Jun. 16, 2006, pp. 183-186.
Lee et al., "Very High Tunable Inter-Digital Capacitor Using Bismuth Zinc Niobate (BZN) Thin Film Dielectrics for Microwave Applications", Korean Electronics Letter, Jul. 20, 2006, pp. 851-853, vol. 42, No. 15.
Ko et al., "Phase Decomposition and Dielectric Properties of Reactively Sputtered Bismuth Zinc Niobate Pyrochlore Thin Films Deposited from Monoclinic Zirconolite Target", Journal of Electroceramics, 2005, pp. 171-175, vol. 14.

* cited by examiner

*Primary Examiner*—Eric Thomas
(74) *Attorney, Agent, or Firm*—The Webb Law Firm

(57) ABSTRACT

Provided are a tunable inter-digital capacitor (IDC) and a method of manufacturing the same. The tunable IDC includes: a first dielectric layer formed on a substrate and having electrode pattern grooves of an IDC including a ground line and a signal line formed therein; electrode metal patterns formed in the electrode pattern grooves of the IDC including the ground line and the signal line formed in the first dielectric layer; and a second dielectric layer formed on an upper surface of the first dielectric layer to cover all of the electrode metal patterns except for parts of the ground and signal lines. Therefore, it is possible to increase tunability of the IDC and reduce drive voltage.

5 Claims, 6 Drawing Sheets

TUNABLE INTER-DIGITAL CAPACITOR AND METHOD OF MANUFACTURING THE SAME

BACKGROUND OF THE INVENTION

1. Field of the Invention

The present invention relates to a tunable inter-digital capacitor (IDC) and a method of manufacturing the same. More particularly, the present invention relates to a tunable IDC capable of increasing tunability thereof and reducing drive voltage by concentrating a fringing electric field generated at the edge of an IDC electrode in a dielectric material to equalize electric field distribution, and a method of manufacturing the same.

2. Description of the Related Art

In general, an IDC utilizes a material such as a ferroelectric or paraelectric material whose permittivity varies depending on an applied electric field.

Since a conventional tunable IDC has electrodes exposed on a tunable dielectric material, i.e., in the air, a considerable part of the applied electric field is distributed in the air and only a part thereof exists in the dielectric material. In addition, the part existing in the dielectric material is not uniformly distributed.

Therefore, the conventional tunable IDC has some drawbacks in that it has low tunability and requires high direct current (DC) bias in a high frequency region.

SUMMARY OF THE INVENTION

In consideration of the above problems of the conventional tunable inter-digital capacitor (IDC), it is an object of the present invention to provide a tunable IDC capable of increasing the tunability of an IDC and a method of manufacturing the same.

In addition, it is another object of the present invention to provide a tunable IDC capable of reducing drive voltage of an IDC and a method of manufacturing the same.

Furthermore, it is yet another object of the present invention to provide a tunable IDC capable of increasing the couplings of an inter-digital type coupler and a method of manufacturing the same.

In order to achieve the above objects, according to one aspect of the present invention, a tunable IDC comprises: a first dielectric layer formed on a substrate and having electrode pattern grooves of an IDC including a ground line and a signal line formed in the first dielectric layer; electrode metal patterns formed in the electrode pattern grooves of the IDC including the ground line and the signal line formed in the first dielectric layer; and a second dielectric layer formed on an upper surface of the first dielectric layer to cover all of the electrode metal patterns except for parts of the ground and signal lines.

Here, the first and second dielectric layers may be formed of a ferroelectric material or a paraelectric material.

The IDC may be formed in an inter-digital pattern having a large number of fingers formed between the ground line and the signal line, extending from the ground line and the signal line toward each other, and alternately disposed between each other at predetermined regular intervals.

The thickness of the electrode metal patterns may be substantially the same as the depth of the electrode pattern grooves of the IDC.

The depth of the electrode pattern grooves of the IDC including the ground line and the signal line may be ⅘ to ⅚ of the thickness of the first dielectric layer.

According to another aspect of the present invention, a method of manufacturing a tunable IDC comprises the steps of: (a) forming a first dielectric layer having a predetermined thickness on a substrate; (b) forming electrode pattern grooves of an IDC including a ground line and a signal line in the first dielectric layer; (c) forming electrode metal patterns in the electrode pattern grooves of the IDC including the ground line and the signal line; and (d) forming a second dielectric layer having a predetermined thickness on the first dielectric layer to cover all of the electrode metal patterns formed in the electrode pattern grooves of the IDC including parts of the ground and signal lines.

In step (a), the first dielectric layer may be formed to a thickness of 2000 Å to 4000 Å.

In step (b), the electrode pattern grooves of the IDC including the ground line and the signal line may be formed by a lithography process.

In step (c), the electrode metal patterns may be formed in the electrode pattern grooves of the IDC including the ground line and the signal line using a lithography process after a metal material is deposited to a predetermined thickness on the entire upper surface of the first dielectric layer.

In step (d), after the second dielectric layer is formed to a predetermined thickness on the entire upper surface of the resultant structure, the second dielectric layer may be etched by a lithography process to expose parts of the electrode metal patterns formed in the ground line and signal line.

In step (d), the second dielectric layer may be formed to a thickness of 1000 Å to 3000 Å.

According to yet another aspect of the present invention, a method of manufacturing a tunable IDC comprises the steps of: (a') forming a first dielectric layer having a predetermined thickness on a substrate, and then etching the first dielectric layer to form electrode pattern grooves of an IDC including a ground line and a signal line in the first dielectric layer; (b') depositing a metal material to the same thickness as the depth of the electrode pattern grooves of the IDC on the entire upper surface of the first dielectric layer, and then forming electrode metal patterns in the electrode pattern grooves of the IDC using a lithography process; and (c') depositing a second dielectric layer having a predetermined thickness on the entire upper surface of the resultant structure, and then etching the second dielectric layer to expose parts of the electrode metal patterns formed in the ground line and the signal line.

DESCRIPTION OF THE PREFERRED EMBODIMENTS

Exemplary embodiments of the present invention will now be described in detail with reference to the accompanying drawings.

Embodiments

Figure 1:
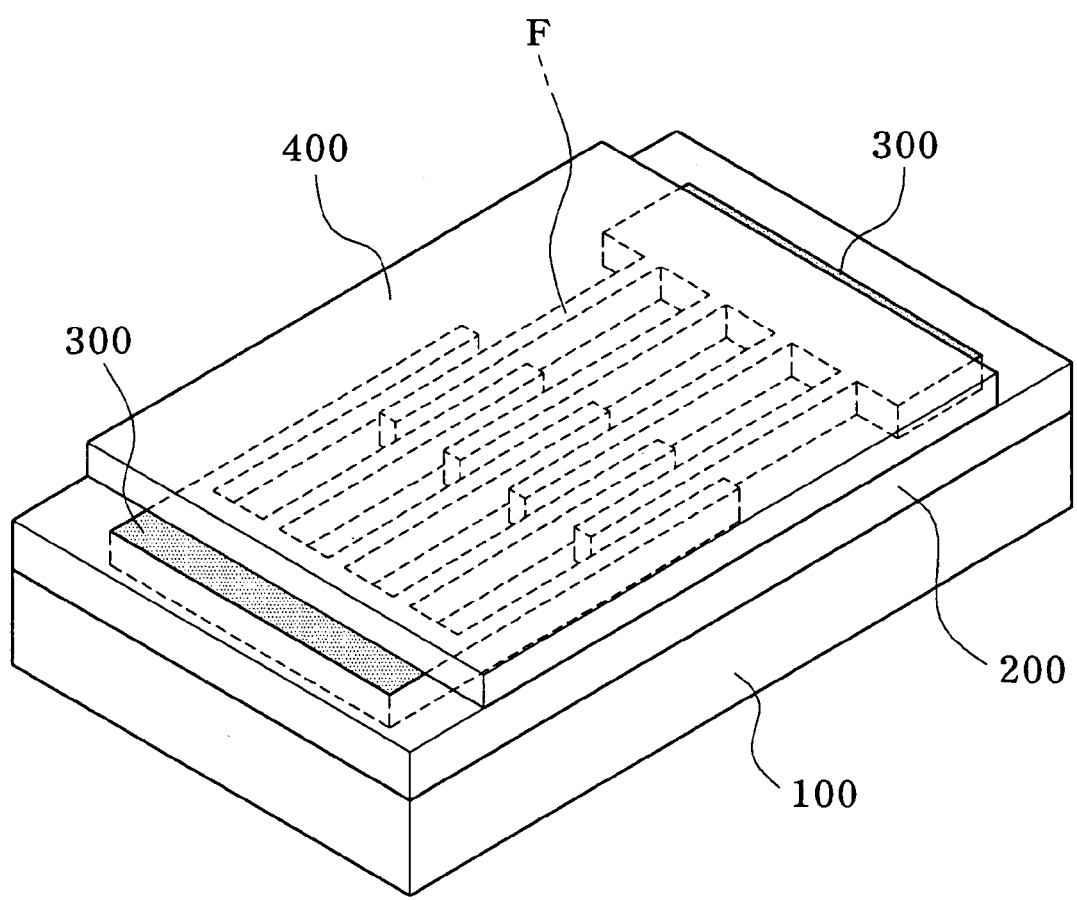
FIG. 1 is a perspective view of a tunable inter-digital capacitor (IDC) according to an exemplary embodiment of the present invention.
Figure 2:
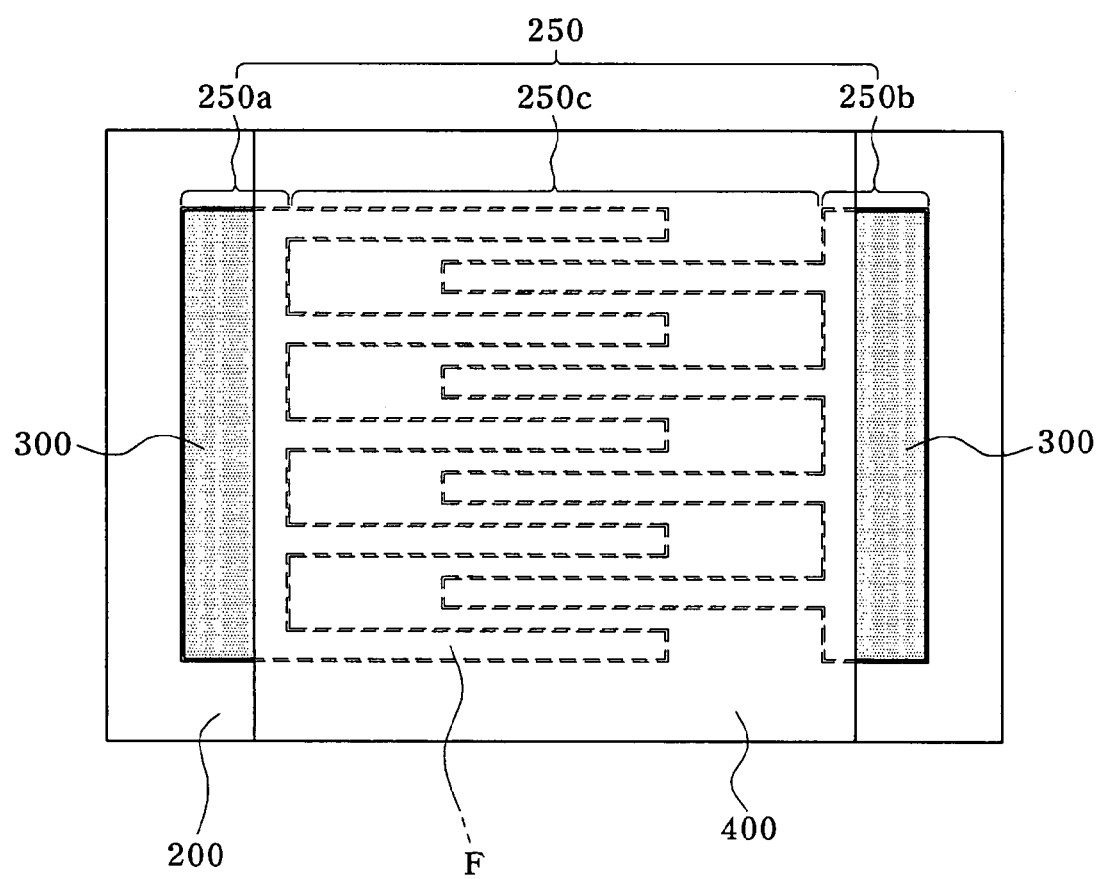
FIG. 2 is a plan view of a tunable IDC according to an exemplary embodiment of the present invention.

FIG. 1 is a perspective view of a tunable inter-digital capacitor (IDC) according to an exemplary embodiment of the present invention, and FIG. 2 is a plan view of the tunable IDC according to an exemplary embodiment of the present invention.

Referring to FIGS. 1 and 2, the tunable IDC according to an exemplary embodiment of the present invention comprises a substrate 100, a first dielectric layer 200, electrode metal patterns 300, and a second dielectric layer 400.

Here, any substrate used for a capacitor may be used as the substrate 100 without limitation. For example, the substrate 100 may comprise one of a semiconductor substrate formed of silicon, germanium, etc., a compound semiconductor substrate formed of SiGe, SiC, GaAs, InGaAs, etc., and an insulating substrate formed of glass, sapphire, alumina, quartz, resin, etc.

The first dielectric layer 200 is formed to a predetermined thickness (preferably, more than 3000 Å) on an upper surface of the substrate 100, and electrode pattern grooves 250 of an IDC 250c including a ground line 250a and a signal line 250b are formed in the first dielectric layer 200.

Here, the IDC 250c is formed in an inter-digital pattern having a large number of fingers F formed between the ground line 250a and the signal line 250b, extending from the ground line 250a and signal line 250b toward each other, and alternately disposed between each other at predetermined regular intervals.

In other words, the IDC 250c has a structure in which a large number of fingers F are disposed between the ground line 250a and the signal line 250b parallel to each other, extend perpendicularly in the form of comb teeth from the ground line 250a and the signal line 250b toward each other, and are alternately disposed between each other.

The electrode metal patterns 300 are formed in the electrode pattern grooves 250 of the IDC 250c including the ground line 250a and the signal line 250b formed in the first dielectric layer 200.

The thickness of the electrode metal patterns 300 may be the same as the depth of the electrode pattern grooves 250 of the IDC 250c including the ground line 250a and the signal line 250b.

Meanwhile, the electrode metal patterns 300 are formed of a conductive metal material, for example, one selected from the group consisting of Pt, Ir, $IrO_2$, Ru, $RuO_2$, or a combination thereof.

The second dielectric layer 400 is formed on the upper surface of the first dielectric layer 200 to cover all of the electrode metal patterns 300 except for parts of the ground line 250a and the signal line 250b.

Meanwhile, the first and second dielectric layers 200 and 400 may be formed of a ferroelectric material, e.g., PZT ($PbZr_xTi_{1-x}O_3$), BST ($Ba_xSr_{1-x}TiO_3$) or Y1 ($SrBi_2Ta_2O_9$), or a paraelectric material, e.g.,. $SrZrO_3$, $BaZrO_3$, $Ba(Zr_x, Ti_{1-x})O_3$ (x>0.2), $Ba(Hf_x, Ti_{1-x})O_3$ (x>0.24) or $Ba(Sn_x, Ti_{1-x})O_3$ (x>0.15).

FIGS. 3a to 3d are cross-sectional views illustrating a method of manufacturing a tunable IDC according to an exemplary embodiment of the present invention.

Figure 3A:
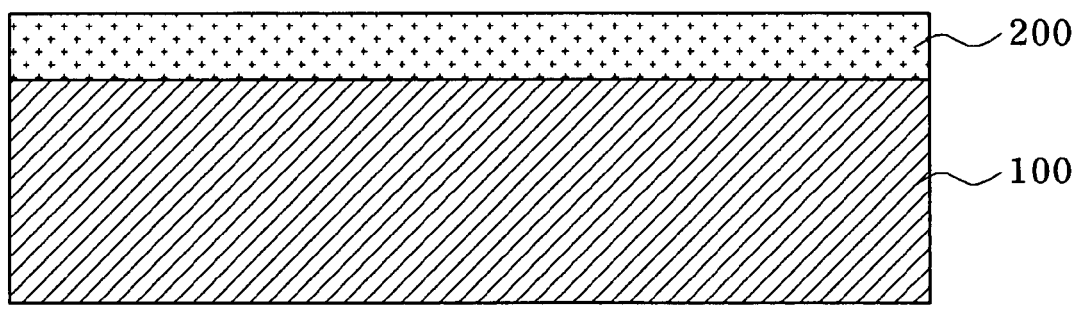
FIGS. 3a to 3d are cross-sectional views illustrating a method of manufacturing a tunable IDC according to an exemplary embodiment of the present invention.

Referring to FIG. 3a, a ferroelectric or paraelectric material is deposited to a thickness of about 2000 Å to 4000 Å (preferably, more than 3000 Å) on an upper surface of a substrate 100 using a radio frequency (RF) magnetron sputtering technique, thereby forming a first dielectric layer 200.

Figure 3B:
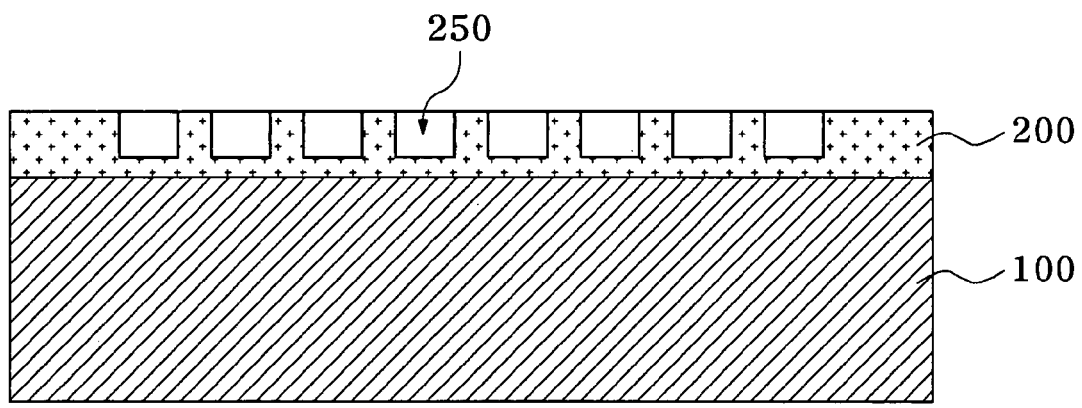

Referring to FIG. 3b, electrode pattern grooves 250 of an IDC 250c (refer to FIG. 2) including a ground line 250a (refer to FIG. 2) and a signal line 250b (refer to FIG. 2) are formed in the first dielectric layer 200 using a lithography process.

Here, the depth of the electrode pattern grooves 250 of the IDC 250c including the ground line 250a and the signal line 250b may be about 4/6 to 5/6 of the thickness of the first dielectric layer 200, i.e., a thickness obtained by subtracting about 500 Å to 1000 Å from the total thickness of the first dielectric layer 200.

Figure 3C:
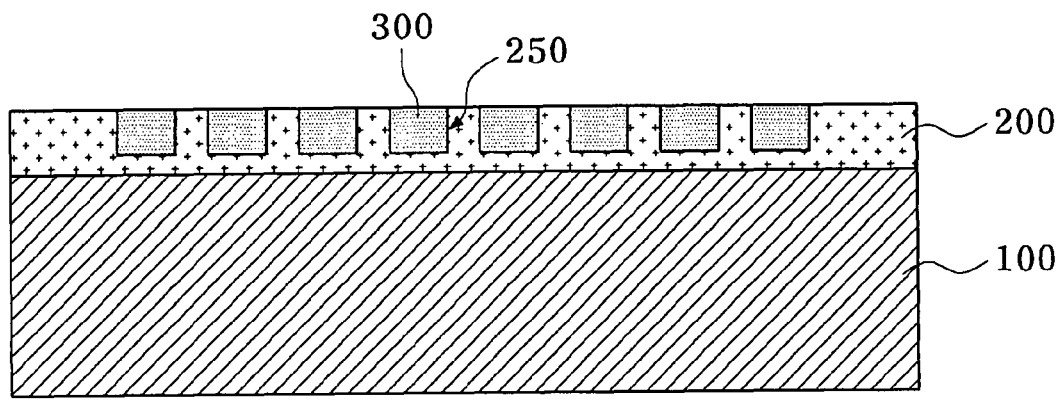

Referring to FIG. 3c, electrode metal patterns 300 are formed in the electrode pattern grooves 250 of the IDC 250c including the ground line 250a and the signal line 250b.

More specifically, after a metal material is deposited to a predetermined thickness on the entire upper surface of the first dielectric layer 200, the electrode metal patterns 300 are formed in the electrode pattern grooves 250 of the IDC 250c including the ground line 250a and the signal line 250b by a lithography process.

Here, the metal material may be deposited to the same thickness as the depth of the electrode pattern grooves 250 of the IDC 250c including the ground line 250a and the signal line 250b.

Figure 3D:
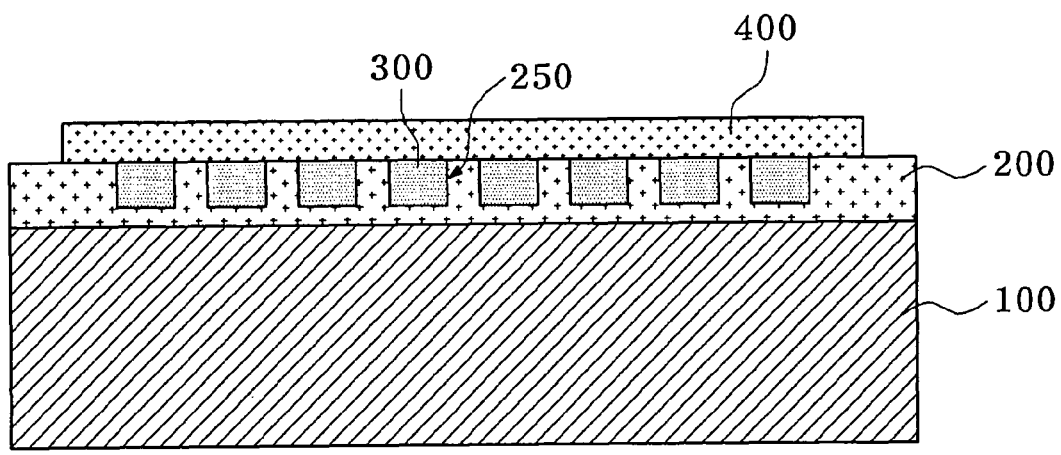

Referring to FIG. 3d, a ferroelectric or paraelectric material is deposited to a thickness of about 1000 Å to 3000 Å (preferably, more than 2000 Å) on the entire surface of the resultant structure using an RF magnetron sputtering technique, thereby forming a second dielectric layer 400. And then, the second dielectric layer 400 is etched by a lithography process to expose parts of the electrode metal patterns 300 formed in the ground line 250a and the signal line 250b.

In other words, the second dielectric layer 400 is formed on the upper surface of the first dielectric layer 200 to cover all of the electrode metal patterns 300 formed in the electrode pattern grooves 250 of the IDC 250c including parts of the ground line 250a and the signal line 250b.

Meanwhile, the lithography processes used in the above-described exemplary embodiments of the present invention are based on the general technology of printing and forming a complicated pattern defining an integrated circuit on a semiconductor wafer. For example, optical lithography, extreme ultraviolet lithography (EUVL), X-ray lithography, ion-beam lithography, electron-beam lithography, dip-pen lithography, proximal probe lithography using an atomic force microscope (AFM) and a scanning tunneling microscope (STM), etc. may be used for the lithography process.

EXAMPLE

Example of a tunable IDC according to an exemplary embodiment of the present invention will now be described in detail below.

In order to concentrate a fringing electric field between electrodes, the electrodes of the tunable IDC were fully embedded into a dielectric thin film, i.e., a Bi—Zn—Nb—O-based (hereinafter, referred to as "BZN") thin film. In other words, the tunable IDC proposed by the present invention was composed of two BZN thin films and electrodes on a silicon substrate and was manufactured in a coplanar waveguide (CPW) structure on the silicon substrate.

The first BZN thin film was deposited to a thickness of about 4000 Å on a $SiO_2/Si$ (300 Å/550 μm) substrate by RF magnetron sputtering. Here, the deposition was performed in a mixture atmosphere of oxygen and argon ($O_2/Ar$) from a $Bi_2(Zn_{1/3}Nb_{2/3})$ 207 ceramic target. Detailed process conditions were disclosed in a thesis entitled "Phase Decomposition and Dielectric Properties of Reactively Sputtered Bismuth Zinc Niobate Pyrochlore Thin Films Deposited from Monoclinic Zirconolite Target" by Kyunghyun Ko, Donghyuk Back, Youngpyo Hong, and Joongho Moon, Journal of Electroceramics, Vol. 1, No. 3, pp. 171-175, 2005.

Afterwards, patterns were formed in order to embed IDC electrodes into the first BZN thin film using an inductive coupled plasma (ICP) dry etching process. The etched thickness of the first BZN thin film was about 3000 Å. The minimum line width and spacing of the etched electrodes were about 1.5 μm. After the patterns were formed, a post-annealing process was performed for about 3 hours at about 700° C. in air so as to crystallize the first BZN thin film.

Subsequently, the electrode patterns formed for electrodes of the IDC were filled with a first platinum (Pt) layer having a thickness of about 3000 Å, and then patterned by a sputtering method and a dry etching method, respectively. The second BZN thin film was deposited to a thickness of about 2000 Å and was etched to cover the electrodes of the IDC under the same conditions as mentioned above. Here, a post-annealing process was performed under the same conditions as the first BZN thin film.

Finally, in order to form a CPW-probe pad, a Pt layer having a thickness of about 1500 Å was deposited and then patterned.

Figure 4:
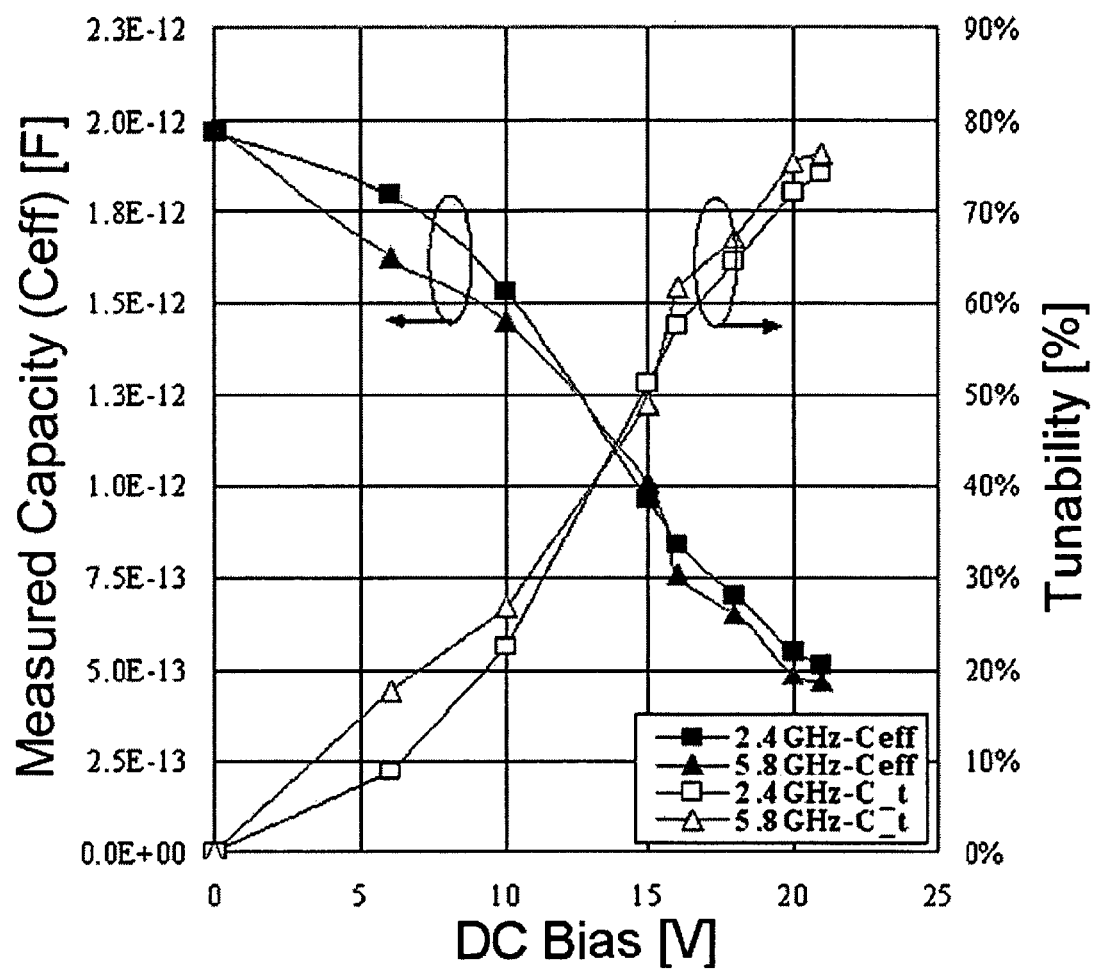
FIG. 4 is a graph showing direct current (DC) bias voltage, capacitance and tunability depending on frequency change in a tunable IDC according to an exemplary embodiment of the present invention.

FIG. 4 is a graph showing direct current (DC) bias voltage, capacitance and tunability depending on frequency change in a tunable IDC according to an exemplary embodiment of the present invention.

Referring to FIG. 4, the capacitance (Ceff) of the tunable IDC according to an exemplary embodiment of the present invention was changed from about $2.0 \times 10^{-12}$ F to about $5.0 \times 10^{-13}$ F at about 5.8 GHz and 20V. In other words, the tunable IDC showed a tunability of about 75%.

Figure 5:
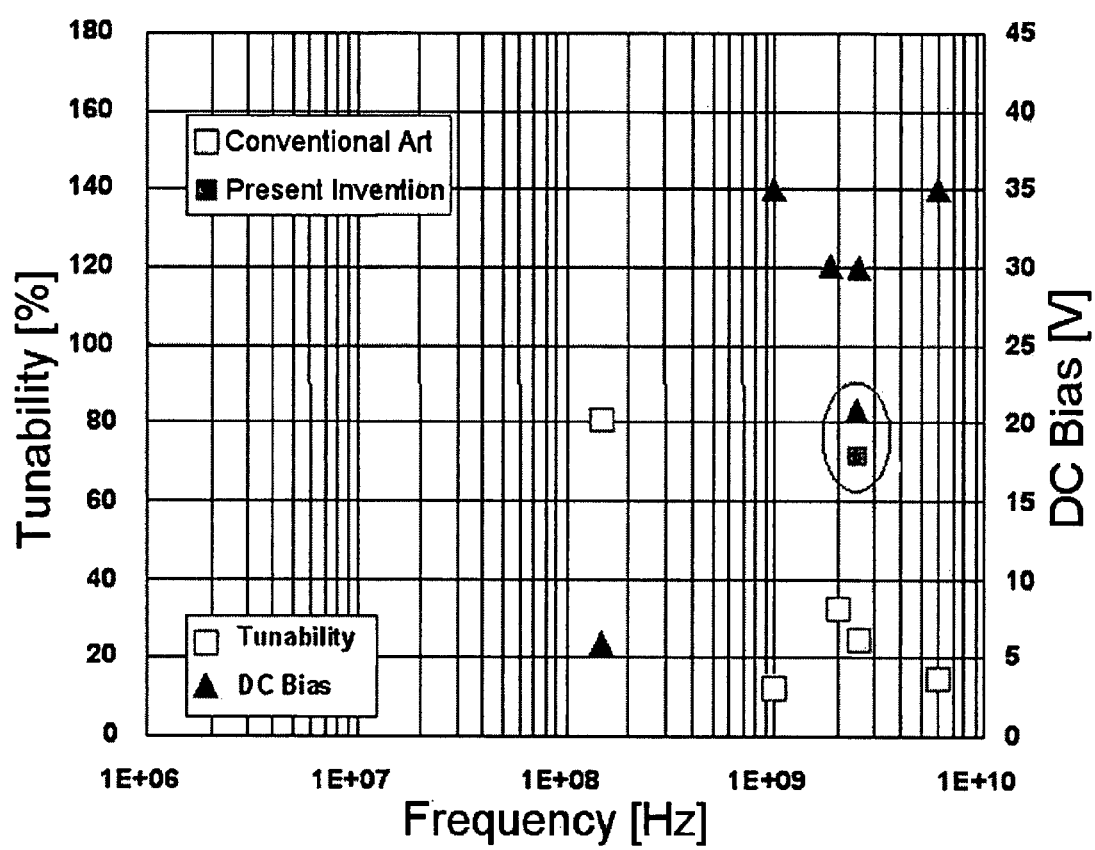
FIG. 5 is a graph showing a comparison between the present invention and the conventional art with respect to tunability and DC bias voltage depending on frequency change.

FIG. 5 is a graph showing a comparison between the present invention and the conventional art with respect to tunability and DC bias voltage depending on frequency change.

Referring to FIG. 5, as a result of measuring tunability and drive voltage, i.e., DC bias voltage depending on frequency change in tunable IDCs according to the conventional art and the present invention, tunability was improved by about 15% to 57%, and DC bias voltage was reduced by about 10V to 15V at a high frequency of 1 GHz or more in comparison with the conventional art. Meanwhile, the red ellipse shown in FIG. 5 denotes tunability ■ and DC bias voltage ▲ of the tunable IDC according to the present invention.

As described above, according to a tunable IDC and a method of manufacturing the same of the present invention, electrodes of the IDC are fully embedded into a dielectric material, and a fringing electric field generated at the edge of the IDC is concentrated in the dielectric material, thereby equalizing electric field distribution. Thus, it is possible to increase the tunability of the IDC and reduce the drive voltage.

In addition, when the present invention is applied to an inter-digital-type coupler, it is possible to increase coupling.

Exemplary embodiments of the present invention have been disclosed herein and, although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A tunable inter-digital capacitor (IDC), comprising:
a first dielectric layer formed on a substrate and having electrode pattern grooves of an IDC including a ground line and a signal line formed in the first dielectric layer;
electrode metal patterns formed in the electrode pattern grooves of the IDC including the ground line and the signal line formed in the first dielectric layer; and
a second dielectric layer formed on an upper surface of the first dielectric layer to cover all of the electrode metal patterns except for parts of the ground and signal lines.

2. The tunable IDC according to claim 1, wherein the first and second dielectric layers are formed of a ferroelectric material or a paraelectric material.

3. The tunable IDC according to claim 1, wherein the IDC is formed in an inter-digital pattern having a plurality of fingers formed between the ground line and the signal line, extending from the ground line and the signal line toward each other, and alternately disposed between each other at predetermined regular intervals.

4. The tunable IDC according to claim 1, wherein the electrode metal patterns have substantially the same thickness as the depth of the electrode pattern grooves of the IDC.

5. The tunable IDC according to claim 1, wherein the depth of the electrode pattern grooves of the IDC including the ground line and the signal line is ⅔ to ⅚ of the thickness of the first dielectric layer.

* * * * *